US008402849B2

(12) United States Patent
Niimi et al.

(10) Patent No.: US 8,402,849 B2
(45) Date of Patent: Mar. 26, 2013

(54) STARTER FOR VEHICLES

(75) Inventors: Masami Niimi, Handa (JP); Yasuyuki Yoshida, Chita-gun (JP); Mitsuhiro Murata, Niwa-gun (JP); Kiyokazu Haruno, Anjo (JP)

(73) Assignee: Denso Corporation, Kariya-Shi (JP)

( * ) Notice: Subject to any disclaimer, the term of this patent is extended or adjusted under 35 U.S.C. 154(b) by 306 days.

(21) Appl. No.: 12/767,274

(22) Filed: Apr. 26, 2010

(65) Prior Publication Data

US 2010/0269631 A1 Oct. 28, 2010

(30) Foreign Application Priority Data

Apr. 28, 2009 (JP) .................. 2009-109099

(51) Int. Cl.
*F02N 15/02* (2006.01)
*F02N 15/06* (2006.01)
*F02N 15/00* (2006.01)
*F02N 15/04* (2006.01)

(52) U.S. Cl. .......................... 74/7 C; 74/7 R
(58) Field of Classification Search .................. 74/7 A, 74/7 C, 7 E
See application file for complete search history.

(56) References Cited

U.S. PATENT DOCUMENTS

| | | | | |
|---|---|---|---|---|
| 3,788,151 A | * | 1/1974 | Campau | 74/7 A |
| 4,586,467 A | * | 5/1986 | Raver | 123/179.3 |
| 5,046,373 A | * | 9/1991 | Zabrowski et al. | 74/7 R |
| 6,572,479 B1 | | 6/2003 | Saito et al. | |
| 6,887,160 B2 | | 5/2005 | Saito et al. | |
| 7,018,314 B2 | | 3/2006 | Hasegawa et al. | |
| 2009/0183595 A1 | * | 7/2009 | Niimi | 74/7 R |

FOREIGN PATENT DOCUMENTS

| | | |
|---|---|---|
| JP | A-2001-187925 | 7/2001 |
| JP | A-2003-003938 | 1/2003 |
| JP | A-2004-257482 | 9/2004 |
| JP | A-2004-270620 | 9/2004 |
| JP | A-2005-330813 | 12/2005 |
| JP | A-2006-161590 | 6/2006 |

OTHER PUBLICATIONS

Jan. 8, 2013 Office Action issued in Japanese Patent Application No. 2009-109099 (with translation).

* cited by examiner

*Primary Examiner* — Justin Krause
(74) *Attorney, Agent, or Firm* — Oliff & Berridge, PLC (57) ABSTRACT

A starter for starting an engine in a vehicle is disclosed. The starter includes a motor and an output shaft that rotates by receiving torque from the motor. The starter also includes a pinion movable body that includes a pinion for transmitting the torque of the motor to a ring gear of the engine. The pinion movable body is provided on an outer circumference of the output shaft integrally with the pinion in a manner allowing movement along an axial direction thereof. The pinion is pushed towards the ring gear by a pinion-pushing means. A motor current-supply means turns ON and OFF energizing current flowing to the motor. A shock absorbing device is disposed on a torque transmitting path transmitting the torque of the motor to the pinion.

4 Claims, 8 Drawing Sheets

Tt: RESTART BY STARTER DURING PROCESS OF STOPPING ENGINE ALL AREAS
Tr: RESTART BY STARTER DURING PROCESS OF STOPPING ENGINE NEGATIVE ROTATION AREA
Tn: RESTART BY STARTER DURING PROCESS OF STOPPING ENGINE POSITIVE ROTATION AREA
Ts: INDEPENDENT RESTART AREA DURING PROCESS OF STOPPING ENGINE

STARTER FOR VEHICLES

CROSS-REFERENCE TO RELATED APPLICATION

This application is based on and claims the benefit of priority from earlier Japanese Patent Application No. 2009-109099 filed on Apr. 28, 2009, the description of which is incorporated herein by reference.

BACKGROUND OF THE INVENTION

1. Field of the Invention

The present invention relates to a starter for starting an engine (internal combustion engine) in a vehicle and the like. In particular, the present invention relates to a so-called plunging-type starter in which a pinion and a ring gear of an engine mesh when the engine is started. The starter can be suitably used in a vehicle equipped with an engine stop/restart apparatus.

2. Description of the Related Art

From environmental considerations and the like, vehicles of recent years include an engine stop/restart apparatus (referred to, hereinafter, as an idle stop apparatus) that automatically controls stopping and restarting of an engine.

As an example of the idle stop apparatus, for example, a device disclosed in Japanese Patent Laid-open Publication No. 2005-330813 is known. The idle stop apparatus described in the publication includes a pinion-pushing means and a motor current-supply means. The pinion-pushing means and the motor current-supply means can operate individually. The pinion-pushing means pushes a pinion to a ring gear side. The motor current-supply means turns ON and OFF the flow of current to the motor.

The idle stop apparatus described in the publication operates as follows when a request for restart is made while the engine is decelerating (before the engine completely stops). The pinion that is not yet rotating is pushed onto a rotating ring gear, thereby meshing the ring gear and the pinion. After the ring gear and the pinion mesh, the pinion rotates as a result of the motor being energized, and the engine is allowed to restart via the ring gear. In this way, the individually operating pinion-pushing means and the motor current-supply means do not require the engine to be completely stopped when restart is performed. Therefore, compared to when restart is performed after the engine has completely stopped, the driver feels that the engine has restarted more quickly.

However, in general, when the engine is stopped, after engine revolution becomes zero immediately before the engine stops, the engine overshoots because of inertia and rotates in the negative direction. Then, the engine revolution gradually decreases while positive rotation and negative rotation are repeated, and the engine eventually stops. Therefore, even when restart is performed during the process of stopping the engine (before the engine is completely stopped), there is always an oscillating period during which the engine repeats positive rotation and negative rotation as described above.

In general, to prevent damage to the motor, the starter is provided with a one-way clutch that is integrated with the pinion. When the pinion is meshed with the ring gear while the engine is rotating in the negative direction, the one-way clutch restricts the rotation of the pinion. In other words, when the pinion is meshed with the ring gear when the engine is rotating in the negative direction, even when a tooth on the pinion collides with the teeth on the ring gear and the pinion and the ring gear do not mesh, the pinion does not rotate unless the motor provided upstream of the one-way clutch is also rotated. Load is applied to a temporarily jamming portion between the pinion and the ring gear by the pinion-pushing means in a state in which the tooth of the pinion and the teeth of the ring gear have collided. As a result, shock load occurs. In addition, load torque including inertia moment of the engine and friction load further increases the shock load.

The jamming occurs at the edge portions of the pinion and the ring gear. Therefore, the edge portions are prone to wear. In general, the ring gear is often greater in hardness than the pinion. Therefore, the pinion is more likely to be further damaged by the edge portion of the ring gear. Moreover, the pinion ordinarily has about one-tenth the number of teeth of the ring gear or less. Therefore, the damage rate per tooth of the pinion is ten times that of the ring gear or more. As a result, the damage to the pinion shortens the life of the idle stop apparatus.

To reduce damage to the pinion, a no-restarting period during which restart is prohibited is required to be set when the engine is rotating in the negative direction. However, as a result of the no-restarting period being set, prompt restarting of the engine becomes difficult to achieve. Usability of the idle stop apparatus is degraded.

SUMMARY OF THE INVENTION

The present invention has been achieved in light of the problems of the conventional technology described above. An object of the present invention is to provide a starter capable of preventing damage to a pinion, quickly restarting an engine, and meshing the pinion with the ring gear and restarting the engine even when the engine is rotating in the negative direction during an oscillating period immediately before the engine stops, thereby allowing the engine to be restarted during an overall process of stopping the engine, including during the oscillating period immediately before the engine is stopped.

According to a first aspect of the invention, a starter includes: a motor that generates torque by being energized; an output shaft that rotates by receiving the torque from the motor; a pinion movable body that includes a pinion for transmitting the torque of the motor to a ring gear of an internal combustion engine, and is provided on an outer circumference of the output shaft integrally with the pinion in a manner allowing movement along an axial direction of the output shaft; a pinion-pushing means for pushing the pinion towards the ring gear side; a motor current-supply means for turning ON and OFF energizing current flowing to the motor. The motor current-supply means operates separately and independently from the pinion-pushing means. And a shock absorbing device that is disposed on a torque transmitting path transmitting the torque of the motor to the pinion such that the torque of the motor is transmitted to the ring gear of the engine, and reduces shock occurring when the pinion meshes with the ring gear.

In the starter of the present invention, the shock absorbing device is disposed on the torque transmitting path between the motor and the pinion, thereby reducing shock that occurs when the pinion meshes with the ring gear.

For example, even when the pinion is meshed with the ring gear that is rotating in the negative direction when a restart request is generated during an oscillating period in a process of stopping the engine, the shock occurring as a result of meshing between the pinion and the ring gear is reduced. Therefore, wear in the pinion and the ring gear is reduced. In addition, the engine can be restarted during negative rotation during the oscillating period in the process of stopping the engine. Therefore, usability of the idle stop apparatus is enhanced. Life required for a starter used in idle stop having a significantly increased operation frequency can be ensured.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DETAILED DESCRIPTION OF THE PREFERRED EMBODIMENT

A starter for vehicles according to an embodiment of the present invention will hereinafter be described with reference to FIG. 1 to FIG. 8.

Figure 1:
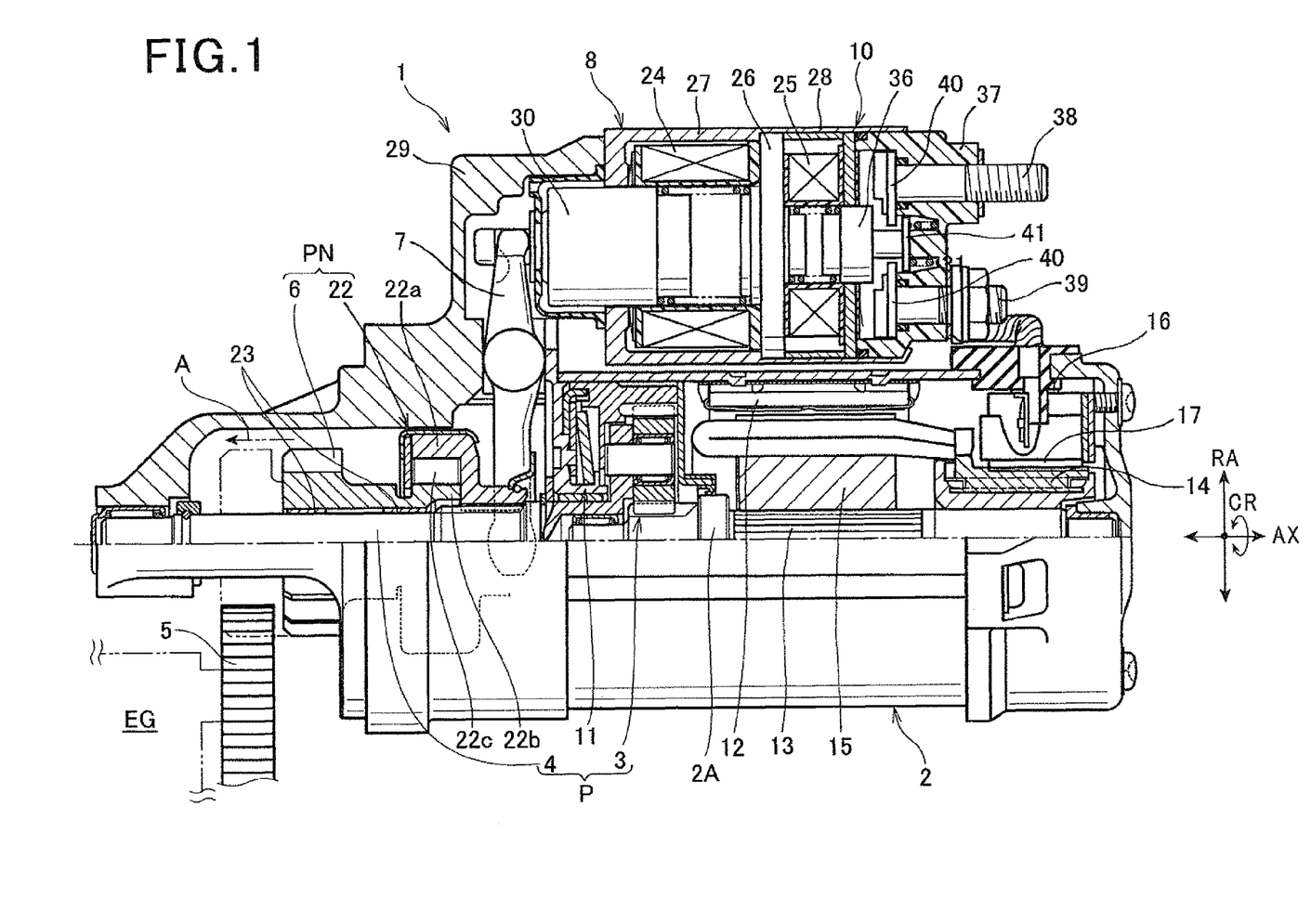
FIG. 1 is a partly sectioned side view showing the overall structure of an on-vehicle starter according to an embodiment of the present invention.

FIG. 1 shows an overall configuration of a starter 1 that starts an engine in a vehicle.

As shown in FIG. 1, the starter 1 according to the embodiment includes an electric motor 2 serving as a power source for driving an engine. The starter 1 also includes a speed reducer 3, an output shaft 4, a pinion movable body PN, a pinion-pushing solenoid 8, a motor current-supply switch 10, and a shock absorbing device 11. The pinion movable body PN includes a pinion 6 and a clutch 22. In addition, the longer direction of the starter 1 is the axial direction AX, the directions which are radially-perpendicular to the axial direction AX are radial direction RA, and the rotation direction centering on the axis of the longer direction is a circumferential direction CR.

The motor 2 receives power supplied from a power supply and rotates, thereby generating torque for starting the engine. The speed reducer 3 is connected to a rotating shaft 2A of the motor 2 and reduces the speed of rotation of the rotating shaft 2A. The output shaft 4 is connected on the output side of the speed reducer 3. Therefore, the speed of the rotation of the motor 2 is reduced by the speed reducer 3, and the rotation is transmitted to the output shaft 4. The pinion 6 is provided on the output shaft 4 such as to be allowed to slide along the output shaft 4. Therefore, as described hereafter, when the pinion-pushing solenoid 8 is driven, the pinion 6 moves towards a ring gear 5 of an internal combustion engine EG, that is, the pinion 6 moves toward left side in axial direction AX in FIG. 1, and the pinion 6 meshes with the ring gear 5 (see arrow A in FIG. 1), the torque of the motor 2 is transmitted to the ring gear 5 by the pinion rotating in the circumferential direction CR. On the other hand, when the pinion-pushing solenoid 8 is not being driven, the pinion 6 separates from the ring gear 5 of the engine EG. That is, the pinion 6 moves toward light side in axial direction AX in FIG. 1. In this instance, the torque of the motor 2 is not transmitted to the ring gear 5.

The pinion movable body PN is configured integrally with the pinion 6 and disposed on the outer circumference of the output shaft 4. Using its electromagnetic force, the pinion-pushing solenoid 8 pushes the pinion movable body PN via a shift lever 7 in a direction moving away from the motor 2 in the axial direction AX, namely in a direction moving towards the ring gear 5 of the engine EG (leftward direction in FIG. 1, referred to, hereinafter, as a "pushing direction"). The pinion-pushing solenoid 8 and the shift lever 7 configure a pinion-pushing means.

Figure 4:
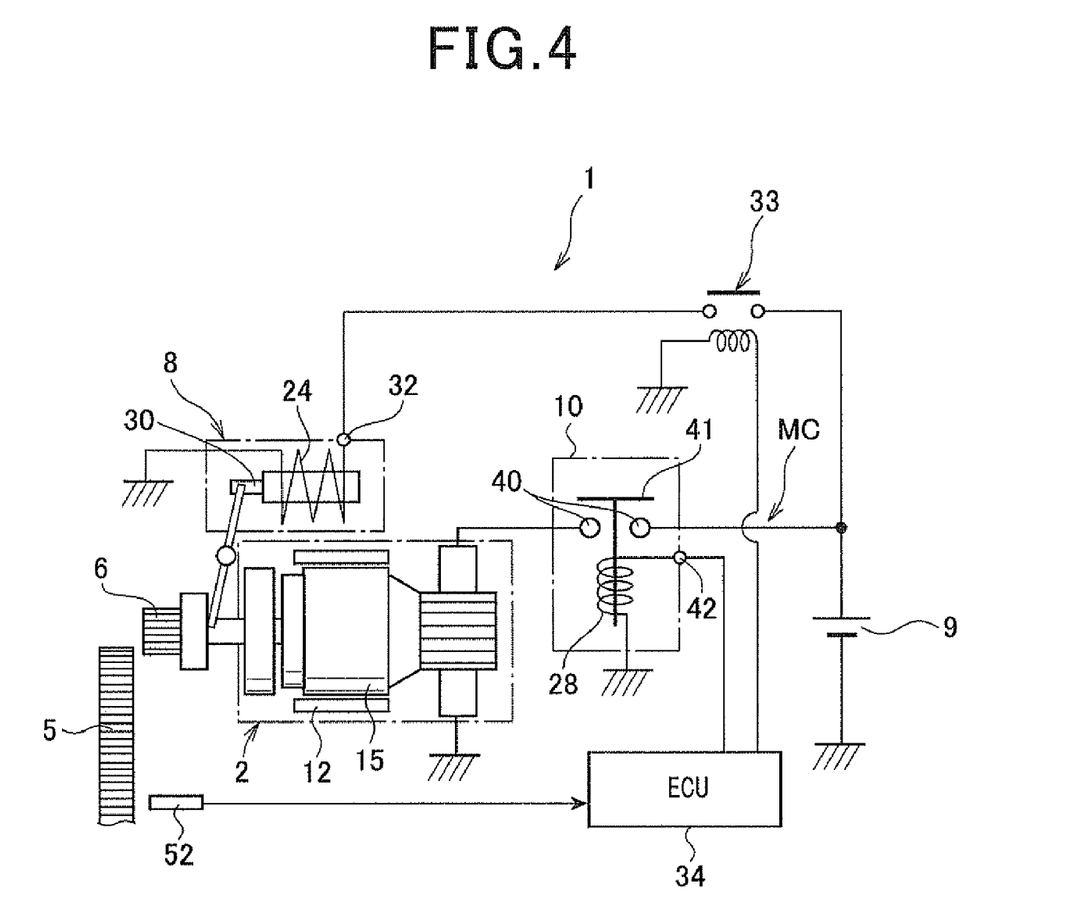
FIG. 4 is an electric circuit diagram of the starter.

As shown in FIG. 4, a motor circuit MC for sending a direct current to the motor 2 is connected to an in-vehicle battery 9. Based on a switching signal from an electronic control unit (ECU) 34 described hereafter, the motor current-supply switch 10 opens and closes motor contacts 40 and 41 (described hereafter) in the motor circuit MC. The shock absorbing device 11 reduces shock that occurs during a process by which the pinion 6 meshes with the ring gear 5.

Each constituent element described above will be described in detail below.

The motor 2 is, for example, a brushed direct-current motor including a field magnet 12, an armature 17, and a brush. The field magnet 12 is configured by a plurality of permanent magnets. The armature 15 includes an armature shaft 13. A commutator 14 is provided on one end section of the armature shaft 13. The brush 17 is disposed such as to be in contact with an outer circumferential surface (referred to as a commutator surface) of the commutator 14. A brush spring 16 presses the brush 17 against the commutator surface. Instead of the permanent magnets, an electrical magnet configured by a field coil may be used as the field magnet 12.

Figure 2:
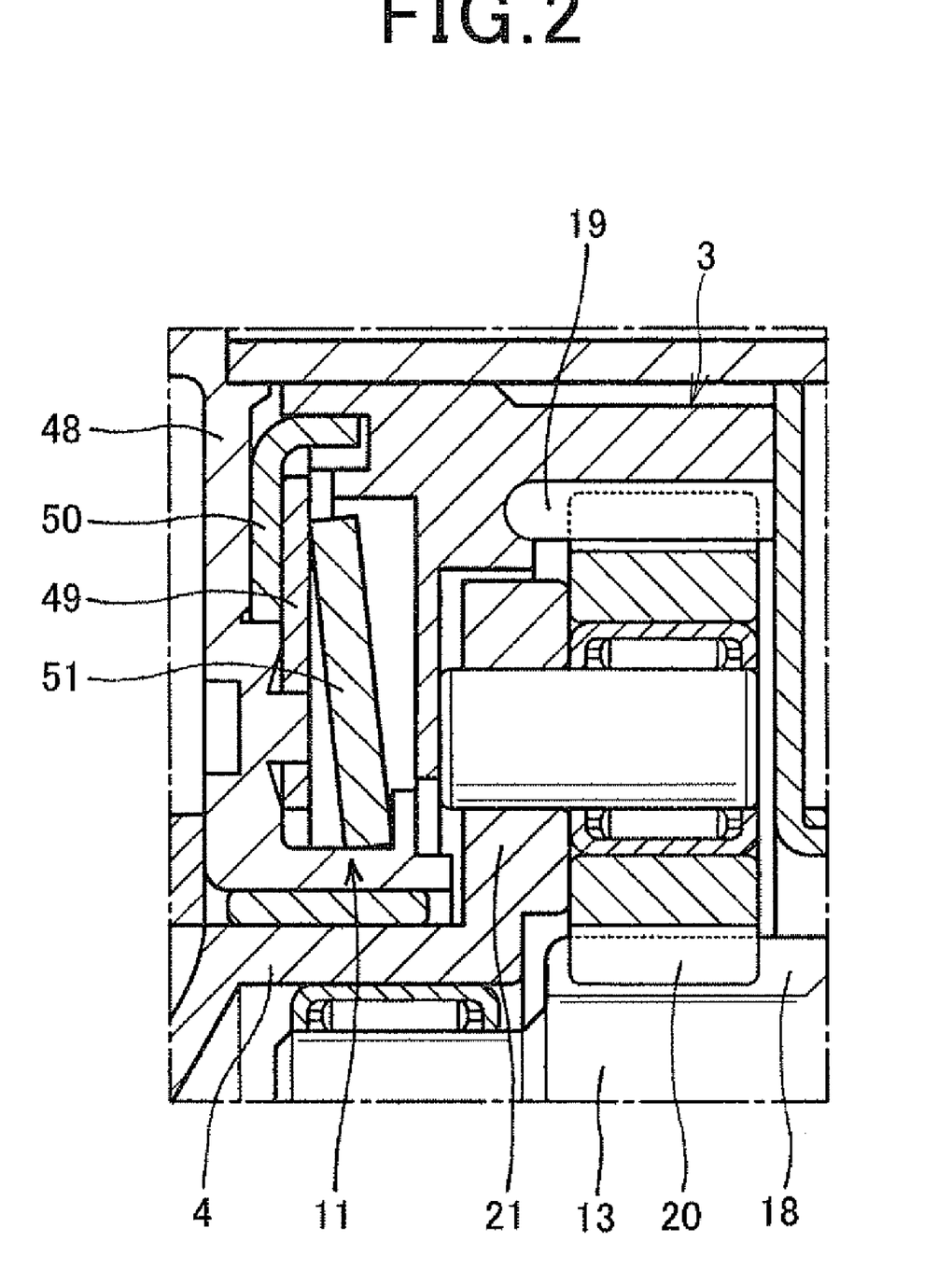
FIG. 2 is a sectional view illustrating the structures of both of a speed reducer and a shock absorbing device adopted by the starter in the embodiment.

As shown in FIG. 2, the speed reducer 3 is a known planetary gear speed reducer including a sun gear 18, an internal tooth gear 19, a plurality of planetary gears 20, and a planetary carrier 21. The sun gear 18 is provided in an end section of the armature shaft 13 opposite of the end section in which the commutator 14 is provided. The internal tooth gear 19 is disposed coaxially with the sun gear 18. The rotation of the internal tooth gear 19 is restricted via the shock absorbing device 11. The plurality of planetary gears 20 mesh with both gears 18 and 19. The planetary carrier 21 picks up the revolution movement of the planetary gears 20 and is provided integrally with the output shaft 4.

The output shaft 4 is disposed on the same axis line as the armature shaft 14 with the speed reducer 3 therebetween. The speed of the rotation of the armature 15 is reduced by the speed reducer 3, and the rotation is transmitted to the output shaft 4.

As described above, the pinion movable body PN is configured by the clutch 22 and the pinion 6. As shown in FIG. 1, the clutch 22 includes an outer ring 22a, an inner ring 22b, a roller 22c, and a roller spring (not shown). The outer ring 22a is fitted onto the outer circumference of the output shaft 4 by a helical spline. The inner ring 2b is disposed within the inner circumference of the outer ring 22a such as to be allowed free relative rotation. The roller 22c intermittently transmits torque between the outer ring 22a and the inner ring 22b. The roller spring urges the roller 22c. The clutch 22 is configured as a one-way clutch that transmits the torque in only one direction, from the outer ring 22a to the inner ring 22b via the roller 22c.

The pinion 6 is provided integrally with the inner ring 22b of the clutch 22. The pinion 6 is held on the outer circumference of the output shaft 4 with a bearing 23 therebetween, such as to be allowed free relative rotation.

The pinion-pushing solenoid 8 has a solenoid coil 24 that forms an electromagnet as a result of being energized. The motor current-supply switch 10 has a switch coil 25 that forms an electromagnet as a result of being energized. A stationary core 26 shared by the solenoid coil 24 and the switch coil 25 is disposed therebetween. A solenoid yoke 27 covers the outer periphery of the pinion-pushing solenoid 8. A solenoid yoke 28 covers the outer periphery of the motor current-supply switch 10. The solenoid yoke 27 and the switch yoke 28 are formed such as to be connected in the axial direction. The solenoid yoke 27 and the switch yoke 28 are integrally provided as a single overall yoke ZY. In other words, as shown in FIG. 1, the pinion-pushing solenoid 8 and the motor current-supply switch 10 are disposed in series in the axial direction and configured as a single body. The pinion-pushing solenoid 8 and the motor current-supply switch 10 are disposed in parallel with the motor 2 and fixed to a starter housing 29.

Figure 3:
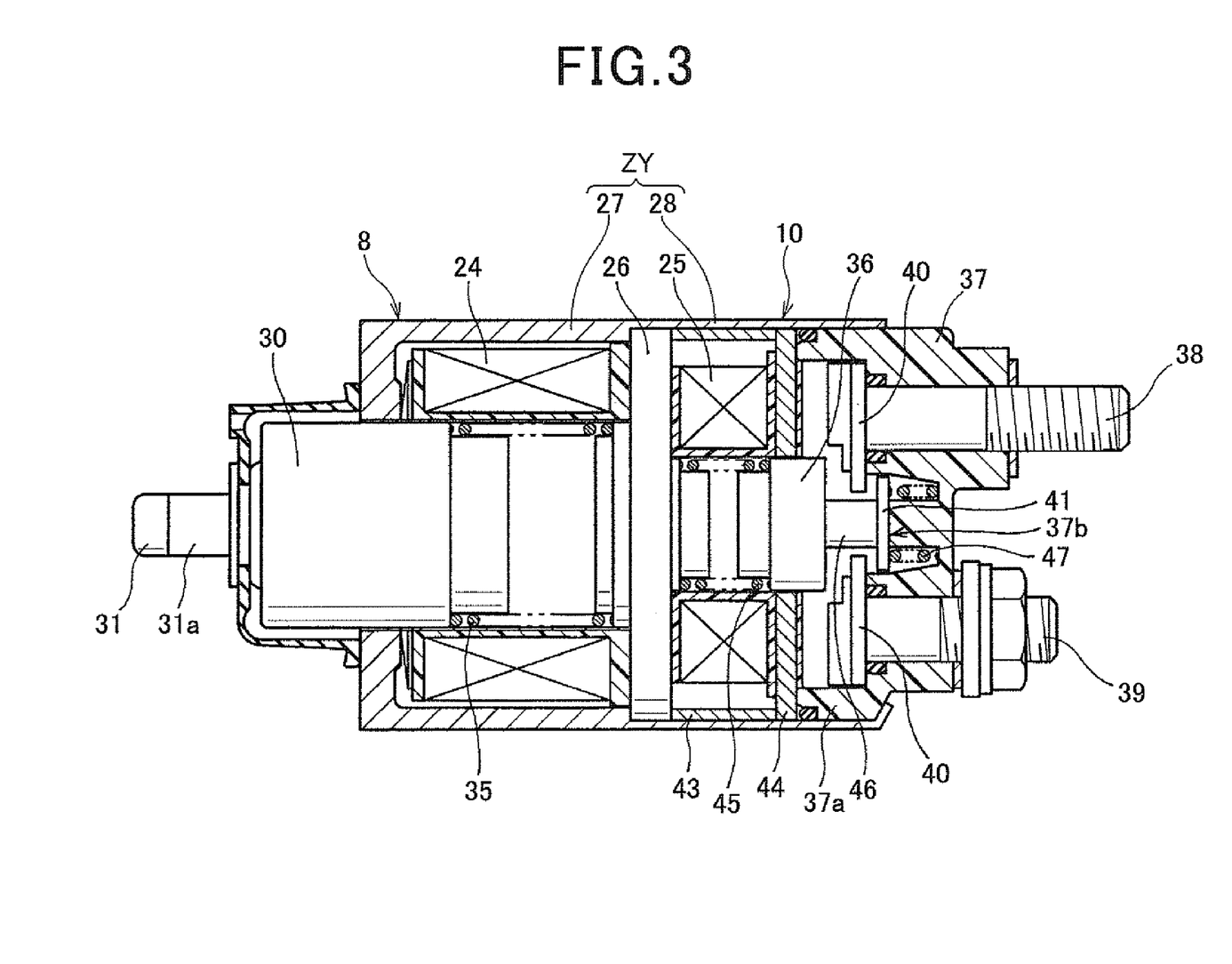
FIG. 3 is a sectional view illustrating a pinion-pushing solenoid and a motor current-supply switch.

As shown in FIG. 3, the overall yoke ZY has a ring-shaped bottom surface on one end side in the axial direction, and an opening on the other end side. In other words, the overall yoke ZY is formed into a cylindrical shape with a bottom. The outer diameter of the overall yoke ZY is the same from one axial end to the other. The inner diameter of the other end side forming the switch yoke 28 is larger than the inner diameter of the one end side forming the solenoid yoke 27. The thickness on the other end side forming the switch yoke 28 is less than the thickness on the one end side forming the solenoid yoke 27. In other words, the inner circumferential surface of the overall yoke has a step between the one end side and the other end side.

The stationary core 26 is inserted into the other end side forming the switch yoke 28 from the opening end of the overall yoke ZY (the opening end of the switch yoke 28). The outer circumferential end surface on one end side of the stationary core 26 is in contact with the step provided on the inner circumferential surface of the overall yoke ZY and is positioned in the axial direction.

The configurations of the pinion-pushing solenoid 8 and the motor current-supply switch 10 excluding the overall yoke ZY (solenoid yoke 27 and switch yoke 28) and the stationary core 26 will be described with reference to FIG. 3 and FIG. 4.

In addition to the solenoid coil 24 disposed in the inner circumference on the one axial end side of the overall yoke ZY forming the solenoid yoke 27, the pinion-pushing solenoid 8 includes a plunger 30 and a joint 31. The plunger 30 can be moved in the axial direction within the inner circumference of the solenoid coil 24, facing one working surface provided on the inner diameter side of the stationary core 26. The joint 31 is configured to transmit the movement of the plunger 30 to the shift lever 7.

Both ends of the solenoid coil 24 receive a supply of current. A connector terminal 32 (see FIG. 4) is connected on one end section of the solenoid coil 24. The other end section is, for example, fixed onto a surface of the stationary core 26 by welding or the like, and grounded. The connector terminal 32 is connected to an electrical wiring connected to a starter relay 33.

ON and OFF of the starter relay 33 is controlled by the ECU 34 (see FIG. 4) that is an electronic controlling unit controlling the operation of the starter 1. When the starter relay 33 is turned ON, current flows to the solenoid coil 24, from the battery 9 and through the starter relay 33.

Energization of the solenoid coil 24 magnetizes the stationary core 26. As a result, the plunger 30 attaches to the working surface of the stationary core 26 against a reactive force of a return spring 35 disposed between the plunger 30 and the stationary core 26. When energization of the solenoid coil 24 is stopped, the plunger 30 is pushed back in the counter-stationary core 26 direction (leftward direction in FIG. 3) by the reactive force of the return spring 35. The plunger 30 has a roughly cylindrical shape with a cylindrical hole in the center portion in the radial direction. The cylindrical hole is open on one end side of the plunger 30 in the axial direction. The cylindrical hole has a bottom surface on the other end side.

The joint 31 is inserted into the cylindrical hole of the plunger 30 with a drive spring (not shown). The joint 31 is rod-shaped. An engaging groove 31a is formed in the end section of one end side of the joint 31 that projects from the cylindrical hole of the plunger 30. One end section of the shift lever 7 engages with the engaging groove 31a. A flange portion is provided in the end section on the other end side of the joint 31. The flange portion has an outer diameter that allows sliding in the inner circumference of the cylindrical hole. The flange portion is pressed against the bottom surface of the cylindrical hole as a result of load applied by the drive spring.

As a result of the movement of the plunger 30, an end surface of the pinion 6 that is pushed in the counter-motor 2 direction by the shift lever 7 comes into contact with an end surface of the ring gear 5. The plunger 30 is then compressed during the movement until the plunger 30 attaches to the one working surface of the stationary core 26. As a result, the drive spring stores reactive force for meshing the pinion 6 with the ring gear 5.

The motor current-supply switch 10 includes the switch coil 25, a movable core 36, a resin contact cover 37, two terminal bolts 38 and 39, stationary contacts 40, a movable contact 41, and the like. The switch coil 25 is disposed within the inner circumference on the other axial end side of the overall yoke ZY forming the switch yoke 28. The movable core 36 moves in the axial direction of the switch coil 25, facing another working surface provided on the inner diameter side of the stationary core 26. The contact cover 37 is assembled such as to cover the opening section on the other end side of the overall yoke ZY (opening of the switch yoke 28). The two terminal bolts 38 and 39 are fixed onto the contact cover 37. A pair of stationary contacts 40 is fixed onto the two terminal bolts 38 and 39. The movable contact 41 provides intermittent electrical connection between the stationary contacts 40.

The switch coil 25 has one end section and another end section on either end. The one end section of the switch coil 25 is connected to a relay terminal 42 (see FIG. 4). The other end section of the switch coil 25 is, for example, fixed onto the surface of the stationary core 26 and grounded. The relay terminal 42 is, for example, provided such as to project further outward than an end surface of the contact cover 37. The relay terminal 42 is connected to an electrical wiring leading to the ECU 34.

An axial magnetic-path member 43 is disposed on an outer circumference side in the radial direction of the switch coil 25. A radial magnetic-path member 44 is disposed on the counter-stationary core 26 side in the axial direction of the switch coil 25. The axial magnetic-path member 43 and the radial magnetic-path member 44 each form a part of a magnetic path. The axial magnetic-path member 43 has a cylindrical shape and is inserted into the inner circumference of the switch yoke 28 with almost no space therebetween. The end surface on one axial end side of the axial magnetic-path member 43 comes into contact with the outer circumferential surface of the stationary core 26, and the axial magnetic-path member 43 is positioned in the axial direction.

The radial magnetic-path member 44 is disposed perpendicular to the axial direction of the switch coil 25. The outer circumferential end surface on one axial end side of the radial magnetic-path member 44 comes into contact with the axial end surface of the axial magnetic-path member 43, thereby restricting the position of the radial magnetic-path member 44 on the coil side. The radial magnetic-path member 44 has a hole that is opened in the center portion in the radial direction, such that the movable core 36 can move in the axial center direction.

Energization of the switch coil 25 magnetizes the stationary core 26. As a result, the movable core 36 attaches to the other working surface of the stationary core 26 against a reactive force of a return spring 45 disposed between the movable core 36 and the stationary core 26. When energization of the switch coil 25 is stopped, the movable core 36 is pushed back in the counter-stationary core 26 direction (rightward direction in FIG. 3) by the reactive force of the return spring 45.

The contact cover 37 has a cylindrical leg section 37a. The leg section 37a is inserted into the inner circumference on the other axial end side of the overall yoke ZY forming the switch yoke 28. The end surface of the leg section 37a comes into contact with the surface of the radial magnetic-path member 44. The contact cover 37 is fixed to the opening end section of the overall yoke ZY by crimping.

The two terminal bolts 38 and 39 are, respectively, a B terminal bolt 38 connected to a high-potential side of the motor circuit (battery 9 side) and an M terminal bolt 39 connected to a low-potential side of the motor circuit (motor 2 side). The pair of stationary contacts 40 are provided separately from (or integrally with) the two terminal bolts 38 and 39. The pair of stationary contacts 40 is electrically connected to the two terminal bolts 38 and 39 on the inner side of the contact cover 37 and mechanically fixed.

The movable contact 41 is disposed further to the counter-movable core 36 side (right side in FIG. 3) than the pair of fixed contacts 40. The movable contact 41 receives load from a contact pressure spring 47 and is pressed against an end surface of a resin rod 46 that is fixed to the movable core 36. However, an initial load of the return spring 45 is set to be greater than an initial load of the contact pressure spring 47. Therefore, when the switch coil 25 is not energized, the movable contact 41 sits on an internal seating surface 37b of the contact cover 37 in a state in which the contact pressure spring 47 is compressed.

The motor contacts are formed by the pair of stationary contacts 40 and the movable contact 41. The movable contact 41 comes into contact with the stationary contacts 40 with a predetermined pressing force by being urged by the contact pressure spring 47. The movable contact 41 allows conduction between both stationary contacts 40. As a result, the motor contact is closed. When the movable contact 41 separates from the pair of stationary contacts 40, the conduction between the stationary contacts 40 is broken. As a result, the motor contact is opened.

As shown in FIG. 2, the shock absorbing device 11 includes a center case 48, a stationary friction plate 49, a rotation friction plate 50, a disc spring 51, and the like. The center case 48 restricts rotation of the stationary friction plate 49. The rotation friction plate 50 is sandwiched between the stationary friction plate 49 and the center case 48. In addition, the rotation friction plate 50 engages with the internal tooth gear 19 of the speed reducer 3 in a manner not allowing relative rotation. The disc spring 51 presses the stationary friction plate 49 towards the rotation friction plate 50 side. The rotation of the rotation friction plate 50 is restricted by the rotation friction plate 50 and the stationary friction plate 49 engaging on their friction surfaces. When excessive torque exceeding a set torque set in advance works on a torque transmitting path P of the starter 1, the torque of the rotation friction plate 50 exceeds the frictional force between the stationary friction plate 49 and the rotation friction plate 50. Therefore, the rotation friction plate 50 spins (slides) in relation to the stationary friction plate 49. As a result, the shock absorbing device 11 blocks the transmission of excessive torque. According to the embodiment, the torque transmitting path P is configured to include the speed reducer 3 and the output shaft 4.

The center case 48 is disposed perpendicular to the output shaft 4 within the opening side of the starter housing 29. The starter housing 29 prevents rotation of the center case 48 in the circumferential direction and positions the center case 48 in the axial direction.

Next, an operation of the starter 1 will be described.

a) When an ordinary engine startup is performed, "namely an engine that is started by a driver switching ON an ignition switch (not shown) when the engine is completely stopped"

ON operation of an ignition switch generates an engine startup signal. The ECU 34 receives the engine startup signal and performs control to turn ON the starter relay 33. A current is then applied to the solenoid coil 24 of the pinion-pushing solenoid 8 from the battery 9. As a result, the stationary core 26 is magnetized. The one working surface of the magnetized stationary core 26 attracts the plunger 30, and the plunger 30 moves. As a result, the pinion movable body PN is pushed towards the counter-motor 2 direction via the shift lever 7. The end surface of the pinion 6 then comes into contact with the end surface of the ring gear 5, and the pinion 6 stops.

After a predetermined amount of time elapses from the generation of the engine startup signal, the ECU 34 outputs an ON signal to the motor current-supply switch 10. As a result, the switch coil 25 is energized. The movable core 36 is attracted to the other working surface of the stationary core 26. The movable contact 41 comes into contact with the pair of stationary contacts 40 and is urged by the contact pressure spring 47, thereby closing the motor contact. As a result, the motor 2 is energized and torque is generated in the armature 15. The torque is transmitted to the output shaft 4. The rotation of the output shaft 4 is further transmitted to the pinion 6 via the clutch 22. The pinion 6 rotates to a position allowing meshing with the ring gear 5 and is meshed with the ring gear 5 as a result of the reactive force from the drive spring. The torque is transmitted from the pinion 6 to the ring gear 5. The engine is cranked.

After the engine is started, the ECU 34 outputs an engine stop signal. The engine stop signal stops the flow of current to the solenoid coil 24 of the pinion-pushing solenoid 8 and the switch coil 25 of the motor current-supply switch 10. As a result, the attractive force of the pinion-pushing solenoid 8 dissipates. The plunger 30 is pushed back. The pinion 6 separates from the ring gear 5. The pinion 6 retracts to a resting position (the position shown in FIG. 1) on the outer circumference of the output shaft 4 integrally with the clutch 22, and stops.

The attractive force of the motor current-supply switch 10 also dissipates. The movable core 36 is pushed back. As a result, the motor contact is opened. The flow of current from the battery 9 to the motor 2 is stopped. The rotation of the armature 15 gradually slows and stops.

b) Next, operations performed when idle stop is performed or when the driver operates the ignition switch to an engine stop position will be described with reference to FIG. 5 to FIG. 8.

Figure 5:
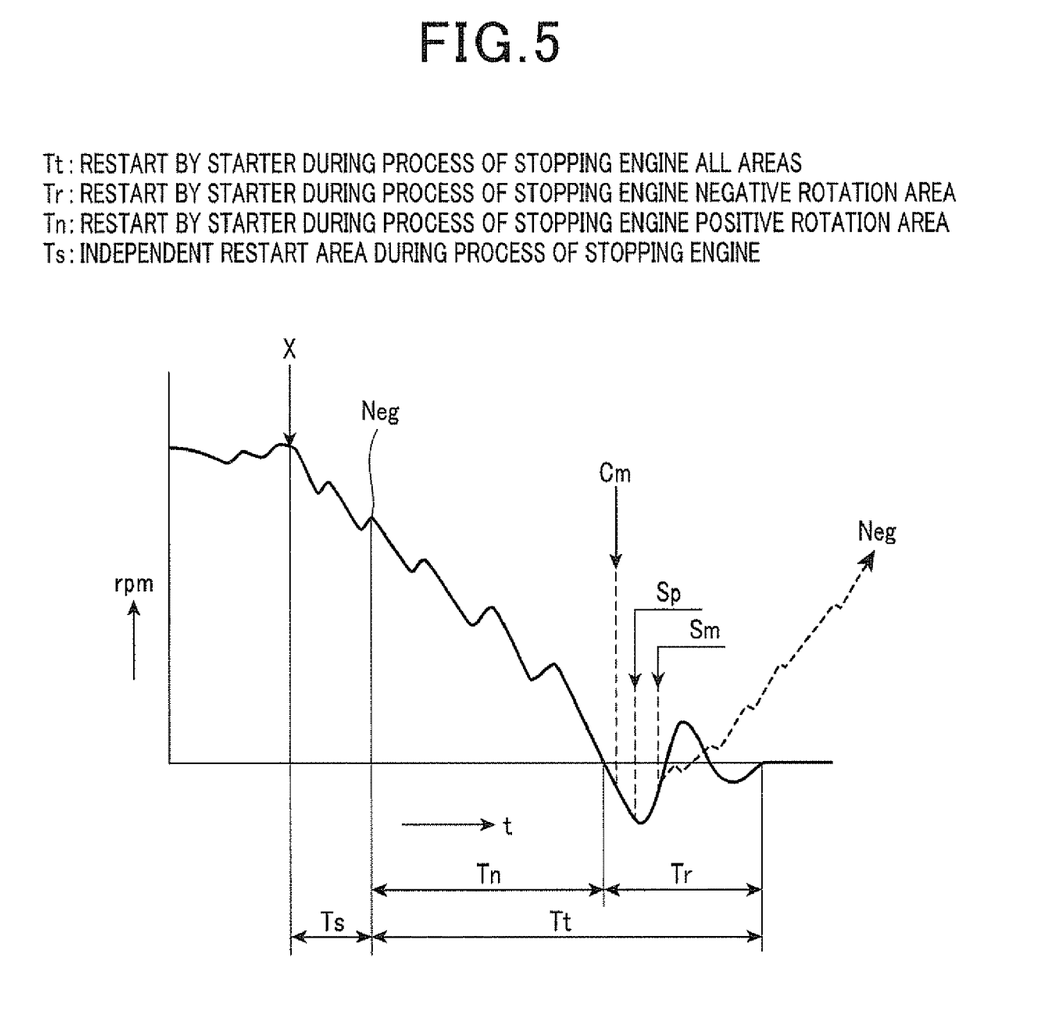
FIG. 5 is a graph showing the revolutions of the internal combustion engine in the internal combustion engine stop process, and horizontal axis is a time scale.

The graph shown in FIG. 5 indicates a number of revolutions Neg during the process of stopping the engine with a horizontal axis indicating time. "X" in FIG. 5 indicates a point of generation of the engine stop signal. "Cm" indicates a point of generation of a restart request based on the wishes of the driver. "Sp" indicates a point at which the pinion-pushing solenoid 8 starts operation. "Sm" indicates a point at which the motor current-supply switch 10 starts operation. "Ts" on the horizontal axis indicates a period in which independent restart can be performed. "Tt" indicates a period requiring a rotation assist by the starter 1 to restart the engine. Within "Tt", "Tn" indicates a positive rotation period and "Tr" indicates a period including negative rotation immediately before engine stops (the oscillating period during which the engine repeats negative rotation and positive rotation).

Figure 6:
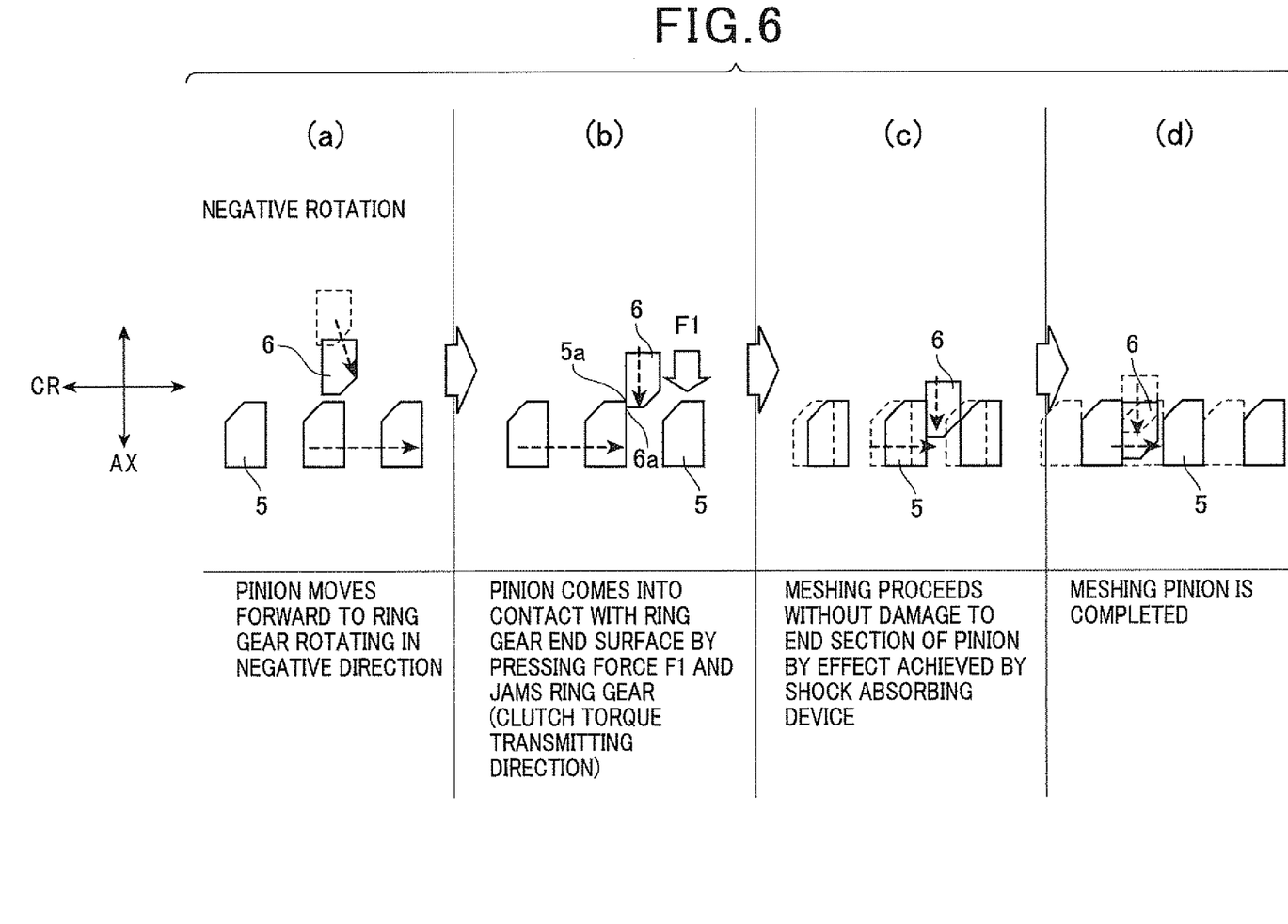
FIG. 6 is an actuation explanation drawing illustrating an engagement process when the pinion engages with the ring gear when the internal combustion engine is reversing in the oscillating period of the internal combustion engine stopping process.
Figure 7:
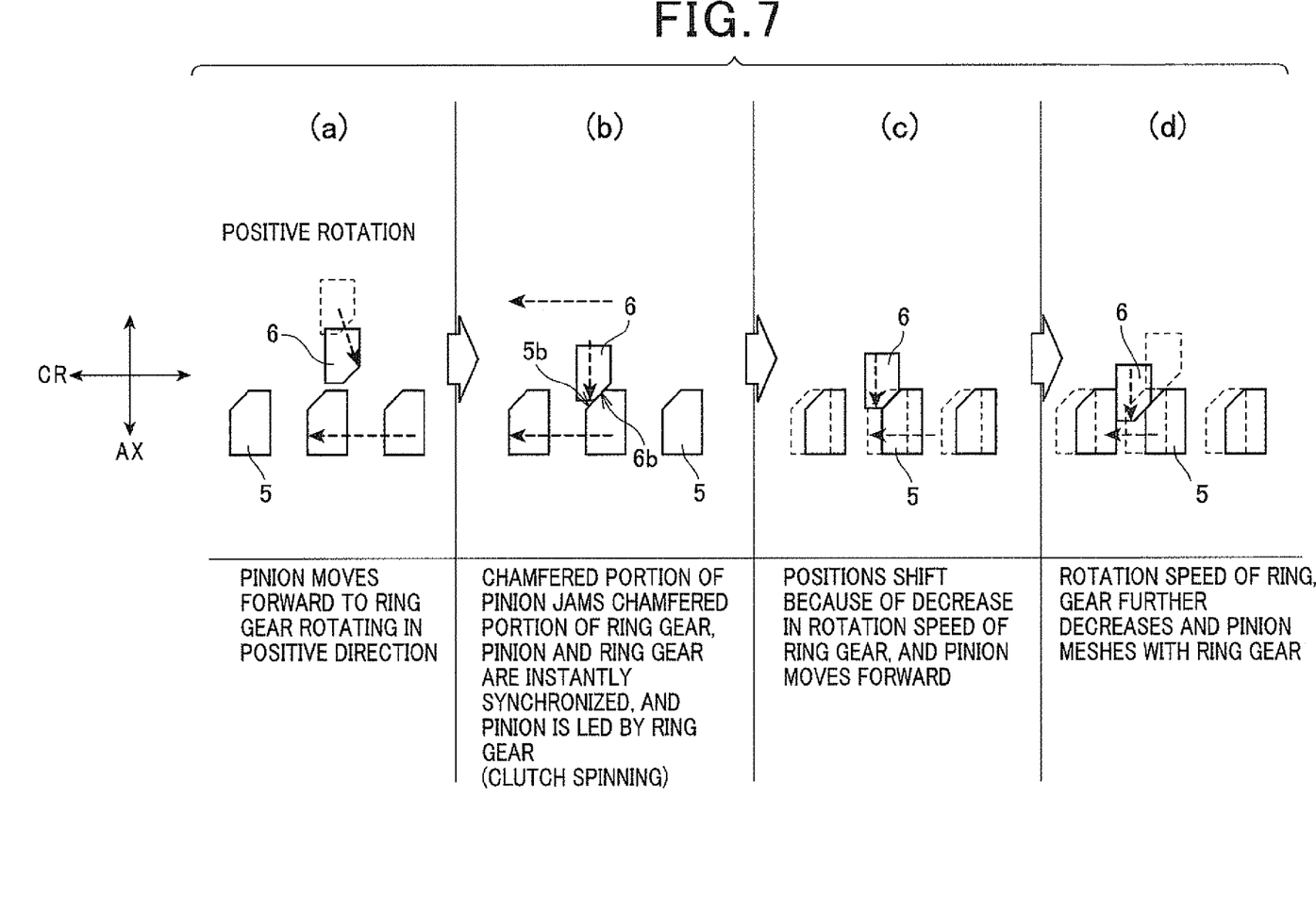
FIG. 7 is an actuation explanation drawing illustrating an engagement process of which the pinion engages with the ring gear when the internal combustion engine is rotating in the positive rotation in the internal combustion engine stop process.

FIG. 6 shows the process by which the pinion 6 meshes with the ring gear 5 during the negative rotation period in the period Tr in FIG. 5. FIG. 7 shows the process by which the pinion 6 meshes with the ring gear 5 during the positive rotation period in the period Tn in FIG. 5.

The engine stop signal is generated at point X in FIG. 5. The ECU 34 outputs the engine stop signal, and fuel injection and supply of intake air to the engine is stopped. As a result, the engine is in the process of stopping. The speed of rotation of the ring gear 5 starts to decrease. During the decrease in rotation speed of the ring gear 5, when a restart request is generated based on the wishes of the driver during the negative rotation period in the period Tr in FIG. 5, the ECU 34 determines that the operation is in the period requiring rotation assist by the starter 1 to restart the engine, based on a signal from an engine revolution detecting means 52 (see FIG. 4). The ECU 34 outputs a pinion-push signal to the pinion-pushing solenoid 8. After a predetermined amount of time has elapsed from the output of the pinion-push signal, the ECU 34 outputs a motor current-supply signal to the motor current-supply switch 10. In other words, first, the pinion movable body PN is pushed towards the counter-motor 2 direction. Then, as shown in FIG. 6, after the pinion 6 meshes with the ring gear 5 that is rotating in the negative direction, the motor 2 is energized and the armature 15 rotates. The torque of the armature 15 is transmitted from the pinion 6 to the ring gear 5. As indicated by a broken line graph in FIG. 5, the engine revolution increases and the engine restarts.

The pinion 6 has a pinion edge portion 6a in a position at which the end surface of the tooth of the pinion 6 on the ring gear 5 side in the axial direction and a meshing surface in the circumferential direction intersect. The ring gear 5 has a ring gear edge portion 5a in a position at which the end surface of the tooth of the ring gear 5 on the pinion 6 side in the axial direction and the meshing surface in the circumferential direction intersect.

When the pinion 6 is meshed with the ring gear 5 that is rotating in the negative direction, as shown in FIG. 6(b), the pinion edge portion 6a may become jammed with the ring gear edge portion 5a in the rotation direction of the ring gear 5 (left/right direction in FIG. 6). The pinion 6 and the ring gear 5 are allowed to mesh as a result of the pinion 6 rotating (rightward direction in FIG. 6(b)) and shifting. However, because the direction is the torque transmitting direction of the one-way clutch 22 connected with the pinion 6, spinning does not occur, and the pinion 6 is not allowed to rotate. In addition, the inertia moment and the friction torque of the motor 2 provided upstream of the clutch 22 is amplified by the speed reducer 3. Therefore, the pinion edge portion 6a and the ring gear edge portion 5a receive a greater shock torque. Therefore, the shock absorbing device 11 is provided according to the embodiment.

The shock torque reaches the set torque of the shock absorbing device 11. The rotation friction plate 50 of the shock absorbing device 11 spins. As a result, increase in the torque value is suppressed.

Figure 8:
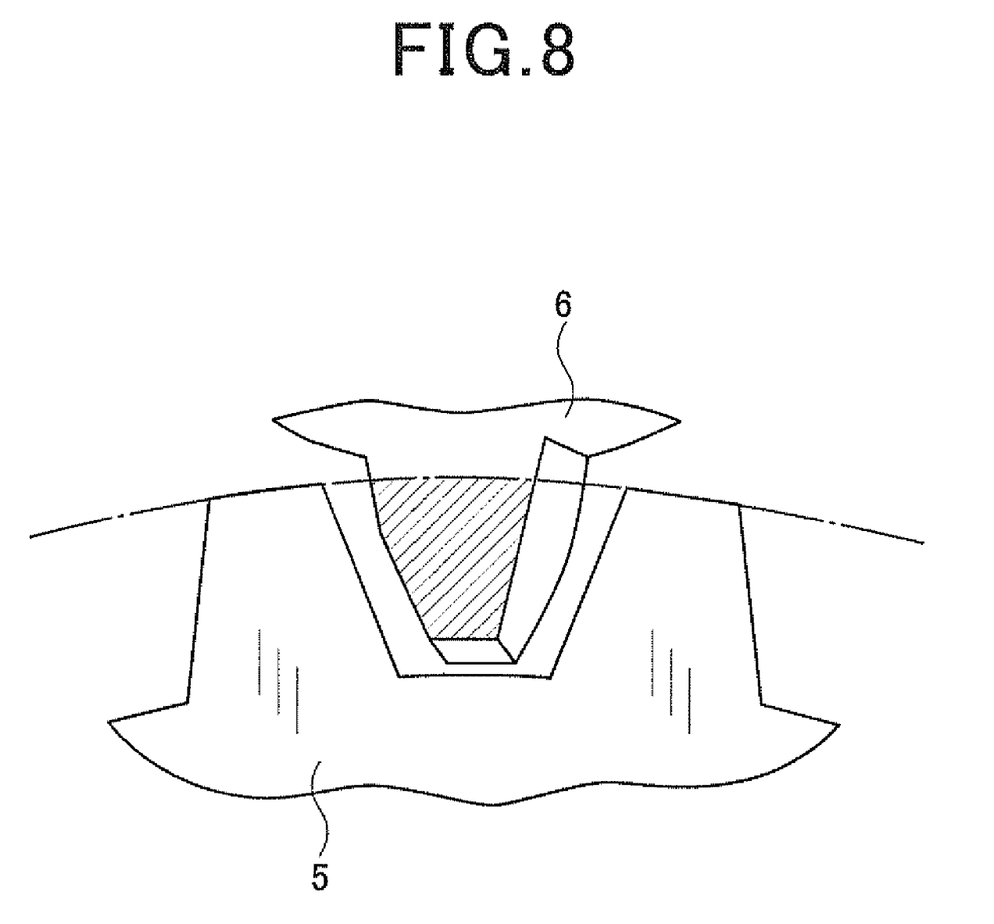
FIG. 8 is a drawing illustrating corresponding between the pinion and the ring gear from the axial direction.

When the pinion edge portion 6a and the ring gear edge portion 5a are jammed, the set torque of the shock absorbing device 11 that limits the occurring shock is set to be smaller by a predetermined value than a shear torque by which the end section of the tooth of the pinion 6 on the ring gear 5 side in the axial direction (axial direction end section of the tooth of the pinion 6 that overlaps with the tooth of the ring gear 5 in the radial direction: the shaded area in FIG. 8) is sheared by the ring gear edge portion 5a.

On the other hand, when the restart request is generated during the period Tn in FIG. 5 (during the positive rotation of the engine) as a result of the driver changing his mind, as shown in FIG. 7(a) and FIG. 7(b), the pinion 6 moves forward in relation to the ring gear 5 that is rotating in the positive direction. A chamfered portion 6b of the pinion 6 and a chamfered portion 5b of the ring gear 5 then are jammed. At this time, the clutch 22 is in the spinning direction when viewed from the ring gear 5 side. Therefore, the rotation of the pinion 6 is instantly synchronized with the rotation of the ring gear 5. The rotation speed of the ring gear 5 decreases from the instant synchronization is achieved. Therefore, as shown in FIG. 7(c) and FIG. 7(d), as a result of shifting of the relative positions of the pinion 6 and the ring gear 5, the pinion 6 moves further forwards and meshes with the ring gear 5.

When the pinion 6 is meshed with the ring gear 5 during the period Tn, as shown in FIG. 7(b), when the chamfered portion 6b of the pinion 6 and the chamfered portion 5b of the ring gear 5 are jammed, the clutch 22 is in the spinning direction when viewed from the ring gear 5 side. Therefore, excessive shock torque does not work on the jamming portion between the pinion 6 and the ring gear 5.

The starter 1 according to the embodiment includes: the motor 2 that generates torque by being energized; the output shaft 4 that rotates by receiving the torque from the motor 2; the pinion movable body (6, 22) that includes a pinion 6 for transmitting the torque of the motor to a ring gear 5 of an engine, and is provided on an outer circumference of the output shaft integrally with the pinion in a manner allowing movement along an axial direction of the output shaft; a pinion-pushing means (equivalent to the pinion-pushing solenoid 8) for pushing the pinion 6 towards the ring gear 5 side; a motor current-supply means (equivalent to the motor current-supply switch 10) for turning ON and OFF energizing current flowing to the motor 2. The motor current-supply means operates separately and independently from the pinion-pushing means. And the shock absorbing device 11 that is disposed on a torque transmitting path P transmitting the torque of the motor to the pinion such that the torque of the motor is transmitted to the ring gear of the engine, and reduces shock occurring when the pinion meshes with the ring gear.

The starter 1 according to the embodiment can be controlled by the ECU 34 such that the pinion-pushing means and the motor current-supply means operate separately and independently. Therefore, during positive rotation in the process of stopping the engine, for example, the ECU 34 operates the pinion-pushing solenoid 8 and pushes the pinion movable body PN to the ring gear 5 side. As a result, the pinion 6 meshes with the ring gear 5. After the pinion 6 and the ring gear 5 mesh with each other, the motor 2 is energized and the engine is restarted.

In the starter 1 according to the embodiment, the shock absorbing device 11 is disposed on the torque transmitting path P between the motor 2 and the pinion 6. Therefore, the shock that occurs in the process by which the pinion 6 meshes in which the ring gear 5 is reduced. Even when a restart request is generated during the oscillating period in the process of stopping the engine and the pinion 6 is meshed with the ring gear 5 that is rotating in the negative direction, the shock occurring as a result of meshing between the pinion 6 and the ring gear 5 can be reduced. Therefore, usability of the idle stop apparatus is enhanced because the engine can be restarted during negative rotation during the oscillating period in the process of stopping the engine. Furthermore, life required for a starter used in idle stop having a significantly increased operation frequency can be ensured.

The shock absorbing device 11 has a torque transmitting intermittent function actualized by engagement of the frictional surfaces between the stationary friction plate 49 and the rotation friction plate 50. Therefore, even when shock occurs numerous times because of a plurality of pulsating rotation numbers, as during the negative rotation period in the process of stopping the engine, as a result of the rotation friction plate 50 spinning (sliding in relation to the stationary friction plate 49) every time (every time shock occurs), the shock absorbing plate 11 continuously absorbs shock in an effective manner.

The planetary speed reducer 3 that reduces the speed of rotation of the motor is disposed on the torque transmitting path P between the motor 2 and the pinion 6. The rotation friction plate 50 of the shock absorbing device 11 engages with the internal tooth gear 19 of the planetary speed reducer 3 in a manner not allowing relative rotation. A shock absorbing mechanism used in an ordinary conventional starter may be used. Therefore, cost increase in a starter used in idle stop can be suppressed.

The pinion 6 includes the pinion edge portion 6a at which the end surface of the tooth on the ring gear 5 side in the axial direction and the meshing surface in the circumferential direction intersect. The ring gear 5 includes the ring gear edge portion 5a at which the end surface of the tooth on the pinion 6 side in the axial direction and the meshing surface in the circumferential direction intersect.

The set torque of the shock absorbing device 11 that limits the occurring shock is set to be smaller by a predetermined value than a shear torque by which the end section of the tooth of the pinion on the ring gear 5 side in the axial direction is sheared by the ring gear edge portion 5a when the pinion edge portion 6a and the ring gear edge portion 5a are jammed in the rotation direction during the process by which the pinion 6 meshes with the ring gear 5. As a result, for example, even when the restart request is generated during the oscillating period in the process of stopping the engine and the pinion 6 is meshed with the ring gear 5 that is rotating in the negative direction, the shock occurring as a result of meshing between the pinion 6 and the ring gear 5 can be reduced. Therefore, grinding of the end section of the tooth of the pinion does not easily occur. As a result, damage to the pinion can be reduced. Reliability of the starter can be enhanced.

In the starter 1 according to the embodiment, the pinion 6 may be greater in hardness than the ring gear 5. As a result, when the edge portion 6a of the pinion 6 and the edge portion 5a of the ring gear 5 are jammed during the process by which the pinion 6 meshes with the ring gear 5, the damage to the end section of the tooth of the pinion 6 is suppressed.

In addition, in the intersecting portion between the meshing surface and the axial direction end surface of the tooth of the ring gear 5, chamfering by one-tenth of the tooth module or more may be performed. Alternatively, the intersecting portion may be shaped into an R-shape. In this instance, the edge of the intersecting portion between the meshing surface and the axial direction end surface of the tooth of the ring gear 5 is eliminated. Therefore, when the edge portion 6a of the pinion 6 and the edge portion 5a of the ring gear 5 are temporarily jammed, the reduction of stress on the jamming portion reduces damage to the pinion 6.

What is claimed is:

1. A starter comprising:
   a motor that generates torque by being energized;
   an output shaft that rotates by receiving the torque from the motor;
   a pinion movable body that includes a pinion for transmitting the torque of the motor to a ring gear of an internal combustion engine, and is provided on an outer circumference of the output shaft integrally with the pinion in a manner allowing movement along an axial direction of the output shaft, the internal combustion engine repeating alternately rotation in a negative direction and rotation in a positive direction immediately before stop of the internal combustion engine;
   a pinion-pushing means for pushing the pinion towards the ring gear;
   a motor current-supply means for turning ON and OFF energizing current flowing to the motor, the motor current-supply means operating separately and independently from the pinion-pushing means; and
   a shock absorbing device that is disposed on a torque transmitting path transmitting the torque of the motor to the pinion such that the torque of the motor is transmitted to the ring gear of the engine, the shock absorbing device comprising:
      a stationary friction plate having a friction surface and disposed in a manner prohibiting rotation; and
      a rotation friction plate having a friction surface that engages with the friction surface of the stationary friction plate and of which rotation is restricted;
   wherein:
      the shock absorbing device is configured to intermittently transmit the torque by the engagement of the friction surfaces between the stationary friction plate and the rotation friction plate; and
      when shock torque exceeding preset torque acts on the torque transmitting path during rotation of the ring gear in the negative direction, the rotation friction plate spins with respect to the stationary friction plate, thus reducing the shock torque.

2. The starter according to claim 1, further comprising:
   a planetary speed reducer that reduces the speed of rotation of the motor is disposed on the torque transmitting path, wherein
   the planetary speed reducer includes an internal tooth gear, the internal tooth gear engaging with the rotation friction plate of the shock absorbing device in a state in which the internal tooth gear relatively prohibits to rotate with the rotation friction plate.

3. The starter according to claim 1, wherein:

the pinion has a plurality of teeth disposed along a circumference of the pinion, and a pinion edge portion at which an end surface of the tooth on the ring gear side in the axial direction and a meshing surface of the tooth in the circumferential direction intersect, the ring gear has a plurality of teeth disposed along a circumference of the ring gear, and a ring gear edge portion at which an end surface of the tooth on the pinion side in the axial direction and a meshing surface in the circumferential direction intersect, and the shock absorbing device has a torque that limits shock occurring when the pinion meshes with the ring gear, the torque being set to be smaller by a predetermined value than a shear torque by which an end section of the tooth of the pinion on the ring gear side in the axial direction is sheared by the ring gear edge portion, when the ring gear is rotating, and the pinion edge portion jams the ring gear edge portion in a manner causing mutual interference in the rotation direction, during a process by which the pinion meshes with the ring gear.

4. The starter according to claim 1, wherein the pinion is greater in hardness than the ring gear.

* * * * *